United States Patent [19]

Sciortino

[11] Patent Number: 4,664,360
[45] Date of Patent: May 12, 1987

[54] ENGINE MOUNT

[75] Inventor: Giacomo Sciortino, Heidelberg, Fed. Rep. of Germany

[73] Assignee: Firma Carl Freudenberg, Weinheim/Bergst, Fed. Rep. of Germany

[21] Appl. No.: 788,339

[22] Filed: Oct. 17, 1985

[30] Foreign Application Priority Data

Jan. 15, 1985 [DE] Fed. Rep. of Germany ....... 3501111

[51] Int. Cl.⁴ ...................... B60G 13/00; F16F 15/04
[52] U.S. Cl. ..................................... 267/8 R; 267/35; 267/64.15; 267/140.1; 267/152; 92/50
[58] Field of Search ........... 267/8, 9, 35, 64.15–64.28, 267/118, 121, 122, 140.1, 140.3, 140.4, 141, 152, 153, 63 R; 248/562, 636; 188/268, 298; 92/48, 50

[56] References Cited

U.S. PATENT DOCUMENTS

| | | | |
|---|---|---|---|
| 3,128,978 | 4/1964 | Sykes | 267/140.4 |
| 3,947,007 | 3/1976 | Pelat | 267/140.1 |
| 4,383,679 | 5/1983 | Kakimoto | 248/562 X |
| 4,415,148 | 11/1983 | Mair et al. | 267/140.1 X |

FOREIGN PATENT DOCUMENTS

| | | | |
|---|---|---|---|
| 0115417 | 8/1984 | European Pat. Off. | 267/140.1 |
| 2947018 | 5/1981 | Fed. Rep. of Germany | 267/140.1 |
| 3125040 | 3/1983 | Fed. Rep. of Germany | 248/562 |
| 3207889 | 9/1983 | Fed. Rep. of Germany | 267/35 |
| 3419437 | 11/1985 | Fed. Rep. of Germany | |

Primary Examiner—Douglas C. Butler
Attorney, Agent, or Firm—Felfe & Lynch

[57] ABSTRACT

A hydraulically damped engine mount comprising a working space bounded by a mounting bracket, a supporting spring and a partition wall, and an equalizing space bounded by the partition wall and by a resilient buffer wall, which are interconnected through a throttle opening and are filled with a liquid, as well as a gas-filled chamber which is disposed within the partition wall and is closed relative to the working space by a circular first disk suspended from an elastic annular diaphragm, the gas-filled chamber being further closed relative to the equalizing space by a second disk suspended from an annular diaphragm, and the first and second disks being formed by first and second neutralizing masses.

8 Claims, 2 Drawing Figures

ENGINE MOUNT

BACKGROUND OF THE INVENTION

The present invention relates to a hydraulically damped engine mount comprising a mounting bracket, a supporting spring and a partition wall which bound a working space, and wherein the partition wall and a resilient buffer wall bound an equalizing space. The working and equalizing spaces are interconnected through a throttle opening and are filled with a liquid. A gas-filled chamber is disposed within the partition wall and is closed relative to the working space by means of a circular first disk suspended from an elastic annular diaphragm.

An engine mount of this type is disclosed in European patent application No. 0 115 417. The elastically suspended disk disclosed therein is rigid and flanked by stops to achieve good damping of low-frequency vibrations and good isolation of high-frequency vibrations. However, in an engine mount used in a motor vehicle, both low and high frequency vibrations can occur and usually occur in combined form. In such a case the effectiveness achieved is quite low.

SUMMARY OF THE INVENTION

The object of the invention is to improve an engine mount of that type in such a way that good isolation of high-frequency vibrations and good damping of low-frequency vibrations are achieved also when these two types of vibrations are simultaneously introduced into the engine mount.

In accordance with the invention, this object is accomplished through an engine mount comprising a mounting bracket, a supporting spring and a partition wall which bound a working space, and wherein the partition wall and a resilient buffer wall bound an equalizing space. The working and equalizing spaces are interconnected through a throttle opening and are filled with a liquid. A gas-filled chamber is disposed within the partition wall and is closed relative to the working space by means of a circular first disk suspended from an elastic annular diaphragm. In the engine mount of the invention, the gas-filled chamber is further closed relative to the equalizing space by means of a second disk elastically suspended from a second annular diaphragm and the first and second disks are formed by first and second neutralizing masses, respectively.

The dampening ability of the engine mount of the invention in operation is believed to be due to the fact that the individual neutralizing masses, which are resiliently supported on one another by the gas-pressure cushion located in the chamber, influence one another with respect to their mobility. Their elastic suspension therefore continually undergoes variation as a function of the forces introduced. The result is good compensation of high-frequency vibrations. A decided advantage is that this desirable action occurs also when low-frequency vibrations are introduced into the engine mount simultaneously with the high-frequency vibrations.

In designing the inventive engine mount for the support of conventional automotive engines, it has been found advantageous for the ratio of the combined neutralizing masses and the proportionate mass of the engine to be not greater than 0.1, and for the ratio between the spring rate of each annular diaphragm and the spring rate of the supporting spring to be not greater than 1.0. It should be noted in this connection that when one of these two parameters is varied, the other parameter must be adjusted in the same sense. The rough adjustment may be made on the basis of theoretical calculations, which requires no further explanations here. The fine adjustment will have to be made as the motor vehicle equipped with the engine mount of the invention is being test-driven under normal operating conditions.

The first and/or the second neutralizing masses may be chain vibrators which comprise at least two successive, radially interposed disks that are elastically secured to each other by means of annular diaphragms. Within each disk, several neutralizing masses are then present which influence one another with respect to their mobility, these neutralizing masses being supported as a whole on the gas-pressure cushion contained in the chamber. The damping and isolating actions in the presence of mixed frequencies are significantly improved thereby.

A further improvement in effectiveness is achieved when the ratio between the hydraulically effective piston surface area of the pedestal secured to the supporting spring and the corresponding hydraulically effective surface area of each neutralizing mass ranges from 1 to 16, and preferably from 2 to 8. The first of these surface areas, the piston surface area, represents about two-thirds of the surface area obtained by projecting the underside of the pedestal and of the supporting spring or the top surface of the buffer wall onto a surface extending perpendicularly to the direction of their motion. The second surface area is the area of the similar projection of each neutralizing mass, increased by 50 percent of the similarly projected surface area of the adjacent annular diaphragms.

All annular diaphragms used in the engine mount of the invention are constructed so that they can be deformed without appreciable damping effort. The result is a particularly marked neutralizing action. The neutralizing masses used weigh from 10 to 200 grams when the inventive engine mount is designed for automotive engines generally, and usually from 10 to 50 grams in the case of a passenger-car engine mount. The disk and the associated annular diaphragm need not be absolutely circular. Oval or polygonal designs can also be used.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF PREFERRED EMBODIMENT

Figure 1:
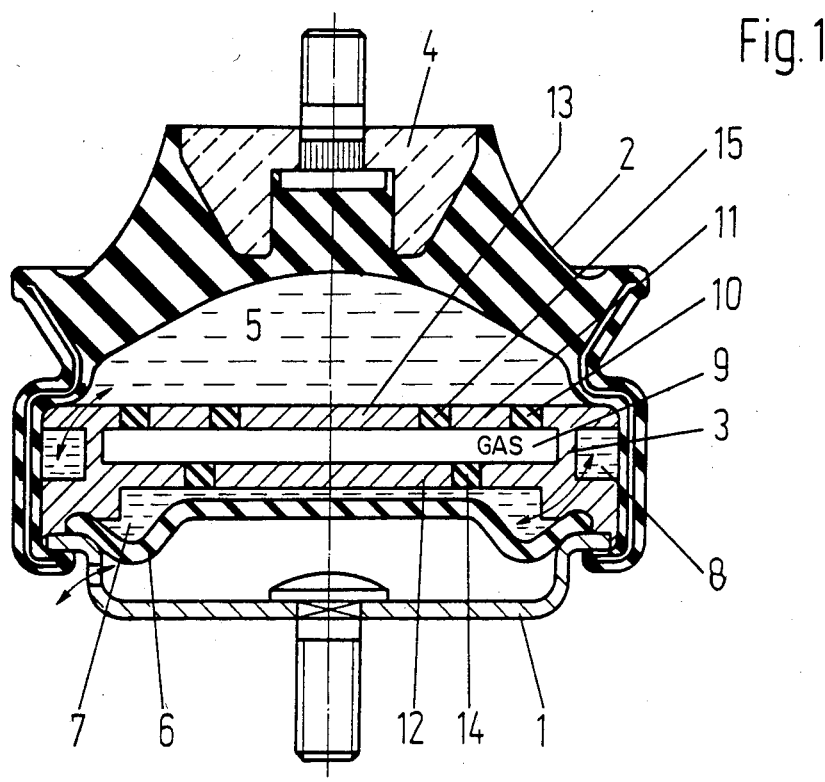
FIG. 1 is a longitudinal section of an exemplary embodiment of the engine mount of the invention.

The engine mount shown in FIG. 1 comprises a mounting bracket 1 and a pedestal 4, which are united and supported on each other by a supporting spring 2 preferably having the shape of a hollow cone.

The mounting bracket 1 is preferably cup-shaped and on its outside abuts on the underside of the partition wall 3, against which it is sealed by means of the beaded edge of a buffer wall 6. Buffer wall 6 is made of a resilient material. The buffer wall 6 and the partition wall 3 together enclose an equalizing space 7. The latter, much like the working space 5 and the throttle opening 8 which connects these two spaces, is filled with a liquid, preferably water incorporating an antifreeze.

The partition wall 3 contains a gas-filled hollow space 9. The pressure of the gas contained in that hollow space is adjusted to a given level and may be either above or below atmospheric pressure. It serves to resiliently support the parts of the boundary walls of the chamber 9 which are elastically displaceable in the direction of the working space 5 and of the equalizing space 7. These parts are formed on the side facing the equilizing space 7 by a disk 12, including an associated annular diaphragm 14, and on the side facing the working space 5 by two radially successive disks 11 and 13 which are elastically secured to each other by means of interposed annular diaphragms 15. Disk 11 is connected to partition wall 3 by annular diaphragm 10.

Figure 2:
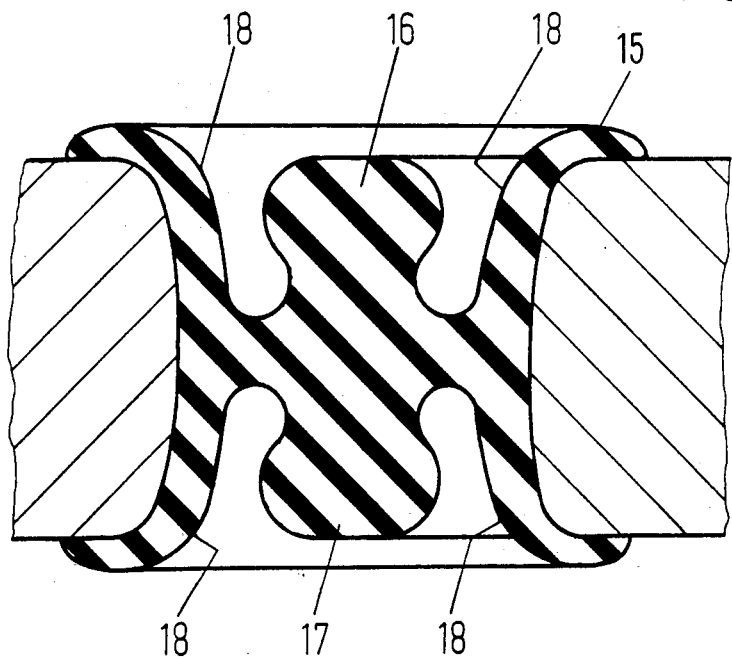
FIG. 2 is a half-sectioned and enlarged view of an examplary embodiment of an annular diaphragm of FIG. 1.

FIG. 2 is a half-sectioned and enlarged view of the annular diaphragms 10, 14 or 15 used in FIG. 1. These are provided on their opposed sides with two axial annular projections 16 and 17, which have a mirror-image relationship with each other and with which are associated, in a spaced relationship, abutment surfaces 18, extending substantially radially, of further annular projections. These abutment surfaces 18 have a mirror-image relationship with the annular projections and serve to limit the axial displaceability of the disks held by the annular diaphragms to a given value, which is determined by the contact between the annular projection 16 or 17 and the respective opposite abutment surface 18. This entails no contact noise, which is a considerable advantage.

It will be appreciated that the instant specification and claims are set forth by way of illustration and not of limitation, and that various changes and modifications may be made without departing from the spirit and scope of the present invention.

What is claimed is:

1. A hydraulically damped engine mount comprising:
   a mounting bracket;
   a supporting spring and a partition wall bounding a working space;
   a resilient buffer wall, the resilient buffer wall and the partition wall bounding an equalizing space, the working space and the equalizing space being interconnected through a throttle opening;
   a liquid filling the working space and the equalizing space;
   a gas-filled chamber which is disposed within the partition wall;
   a first disk suspended from the partition wall, said first disk comprising at least two successive, radially interposed neutralizing masses and annular diaphragms for elastically securing said neutralizing masses to each other and to the partition wall;
   a second disk, said second disk comprising at least one neutralizing mass suspended by bound annular diaphragms, said first and second disks and said partition wall forming said chamber.

2. The engine mount of claim 1, wherein at least one of the first or second disks is a chain vibrator.

3. The engine mount of claim 2, wherein each chain vibrator comprises at least two successive, radially interposed neutralizing masses that are elastically secured to each other by means of annular diaphragms in each respective disk.

4. The engine mount of claim 1, wherein at least one of said annular diaphragms is provided on its opposed sides with axial annular projections which are in mirror-image relationship with each other.

5. The engine mount of claim 4, wherein the axial annular projections have radial boundary surfaces which are associated with and spaced from abutment surfaces of additional annular projections which have a mirror-image relationship with each other and with said annular projections.

6. The engine mount of claim 2, wherein at least one of said annular diaphragms is provided on its opposed sides with axial annular projections which are in mirror-image relationship with each other.

7. The engine mount of claim 6, wherein the axial annular projections have radial boundary surfaces which are associated with and spaced from abutment surfaces of additional annular projections which have a mirror-image relationship with each other and with said annular projections.

8. An engine mount according to claim 1, in which the neutralizing masses have a combined weight of from 10 to 200 grams.

* * * * *